United States Patent
Thomson et al.

(10) Patent No.: US 7,386,240 B2
(45) Date of Patent: Jun. 10, 2008

(54) DISPERSION COMPENSATION IN OPTICAL SYSTEMS

(75) Inventors: Sandy Thomson, Ottawa (CA); Ruibin Jin, Kanata (CA); Eric Hall, Ottawa (CA); Paul MacDonald, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 671 days.

(21) Appl. No.: 10/822,077

(22) Filed: Apr. 9, 2004

(65) Prior Publication Data

US 2005/0226631 A1  Oct. 13, 2005

(51) Int. Cl.
*H04B 10/04* (2006.01)
*H04B 10/12* (2006.01)
*G06F 17/10* (2006.01)

(52) U.S. Cl. .............. 398/193; 398/159; 375/236; 708/300

(58) Field of Classification Search ............ 398/81, 398/147, 149, 150, 159, 193; 375/236; 708/300, 708/306, 317, 318
See application file for complete search history.

(56) References Cited

U.S. PATENT DOCUMENTS

| | | | |
|---|---|---|---|
| 6,888,372 B1 * | 5/2005 | Hazanchuk | 326/39 |
| 2004/0067064 A1 * | 4/2004 | McNicol et al. | 398/158 |
| 2004/0197103 A1 * | 10/2004 | Roberts et al. | 398/159 |
| 2005/0008364 A1 * | 1/2005 | Roberts et al. | 398/33 |
| 2006/0078336 A1 * | 4/2006 | McNicol et al. | 398/147 |

\* cited by examiner

*Primary Examiner*—Jason Chan
*Assistant Examiner*—Nathan Curs
(74) *Attorney, Agent, or Firm*—Jeffrey M. Measures; Borden Ladner Gervais LLP

(57) ABSTRACT

In one aspect a system and method for providing a multi-port memory having a plurality of read ports, each read port including a filter coefficient value representing a dispersion compensation value associated with an optical link. The method includes processing an input optical signal using the filter coefficient values in the multi-port memory to generate an output optical signal for transmission on the optical link.

2 Claims, 4 Drawing Sheets

DISPERSION COMPENSATION IN OPTICAL SYSTEMS

BACKGROUND

High-speed data communications require a high bandwidth channel. Optical fiber is one medium that provides high bandwidth. Optical systems send digital pulses at a high rate, e.g., 10 Gb/s. Ideally, the pulses that are transmitted are received as sent at the other end of the optical pipe. However, optical fibers have a property known as chromatic dispersion, which causes optical pulses launched along a transmission medium to propagate at different velocities for different wavelengths of light. That is, some frequency components of a launched optical pulse will propagate slower than other frequency components, thus spreading out the pulse. If left uncompensated, the effects of chromatic dispersion can degrade signal quality significantly enough to cause loss or corruption of data sent along an optically based network.

SUMMARY

According to an aspect of the invention a method includes providing a multi-port memory having a plurality of read ports, each read port including a filter coefficient value representing a dispersion compensation value associated with an optical link. The method includes-processing an input optical signal using the filter coefficient values in the multi-port memory to generate an output optical signal for transmission on the optical link.

Embodiments can include one or more of the following. The multi-port memory can be a nine-port memory having eight read ports. The method can include receiving the input optical signal, sampling the input optical signal to provide an input data stream, and applying the filter coefficient values to the input data stream to generate one or more output data streams. The method can also include identifying a first portion of the input data stream as an address to the multi-port memory, retrieving a filter coefficient value from the multi-port memory using the address, and adding the retrieved filter coefficient value to a second portion of the input data stream to generate an output data stream.

In another aspect of the invention, a digital filter includes one or more functional units, each functional unit being associated with a lookup table of filter coefficient values. Each functional unit processes an input data stream using the filter coefficient values in the lookup table and generates one or more output data streams for transmission on an optical link.

Embodiments can include one or more of the following. The lookup table can be a multi-port memory having a plurality of read ports. Each read port can store a filter coefficient value. Each filter coefficient value represents a dispersion compensation value associated with the optical link. Each functional unit can include a linear adder tree, also called a linear tree adder, to process a portion of the input data stream. The linear adder tree can include a plurality of adders, each adder having an input for receiving one of a first input sample value and a second input sample value, and an output for providing a partial sum. The digital filter can include a final adder having a first input for receiving a final partial sum from a last one of the plurality of adders in the linear adder tree, a second input for receiving a filter coefficient value from the lookup table, and an output for providing a final sum.

In another aspect of the invention, a system includes an optical transmission path having one or more optical links, a transmit device including a dispersion compensation filter, and a receive device coupled to the transmit device by the optical transmission path. The dispersion compensation filter is associated with one or more lookup tables storing filter coefficient values. Each filter coefficient value represents a dispersion compensation value associated with an optical link. The transmit device processes an input optical signal using the filter coefficient values to generate an output optical signal for transmission to the receive device over an optical link of the optical transmission path.

Embodiments can include one or more of the following. The transmit device can include a pre-encoder circuit to receive an input optical signal, sample the input optical signal and generate an input data stream. The dispersion compensation filter can include one or more functional units, each functional unit for processing a bit of an input data stream.

Each functional unit can include a linear processing component for processing a first portion of the input data stream to generate a linear component of a final sum representing a bit of the input data stream. The linear processing component can include a linear adder tree including a plurality of adders, each adder having an input for receiving one of a first input sample value and a second input sample value, and an output for providing the linear component of the final sum representing a bit of the input data stream.

Each functional unit can also include a non-linear processing component for processing a second portion of the input data stream to generate a non-linear component of the final sum representing a bit of the input data stream. The non-linear processing component can include a multi-port memory having a plurality of read ports, each read port storing a filter coefficient value, wherein processing the second portion of the input data stream includes using the second portion of the input data stream as an address to the multi-port memory to retrieve a filter coefficient value.

Each functional unit can also include a final processing component for generating a final sum representing a bit of the input data stream.

In another aspect of the invention, a computer program product, tangibly embodied in an information carrier, the computer program product being operable to cause a machine to process an input optical signal using filter coefficient values stored in a multi-port memory to generate an output optical signal for transmission on an optical link. The multi-port memory has a plurality of read ports, each read port including a filter coefficient value representing a dispersion compensation value associated with the optical link.

Embodiments can include one or more of the following. The multi-port memory can be a nine-port memory having eight read ports. The computer program product can be further operable to cause a machine to receive the input optical signal, sample the input optical signal to provide an input data stream, and apply the filter coefficient values to the input data stream to generate one or more output data streams.

Advantages of the invention may include one or more of the following. The use of an electronic dispersion compensation module that compensates for channel-induced distortions in optical links eliminates the expense of fiber and optical equipment (e.g., dispersion compensation modules) on the optical links through a plug-and-play solution. The electronic dispersion compensation module provides a software programmable optical solution that is highly flexible in terms of design and implementation. Optical link optimization can be performed in minutes instead of hours or days. The use of a multi-port memory saves on die area and power of an integrated circuit as filter coefficient values can be shared.

The details of one or more examples are set forth in the accompanying drawings and the description below. Further features, aspects, and advantages of the invention will become apparent from the description, the drawings, and the claims.

DETAILED DESCRIPTION

Figure 1:
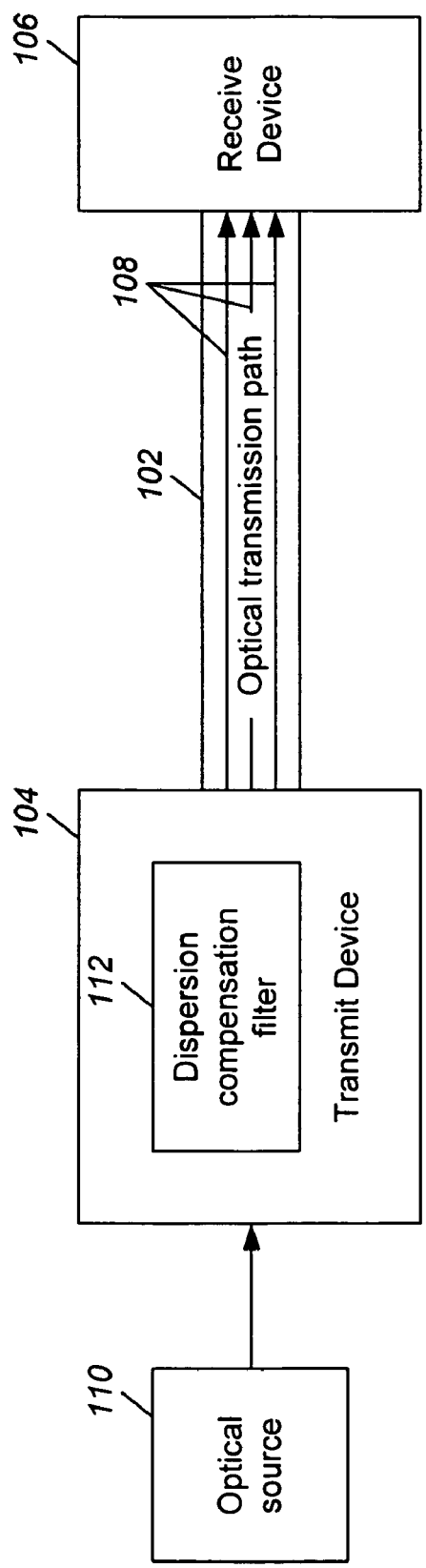
FIG. 1 is a block diagram of an optical fiber communication system.

Referring to FIG. 1 an optical fiber communication system 100 is shown. The optical fiber communication system 100 includes an optical transmission path 102, a transmit device 104, and a receive device 106. The optical transmission path 102 includes one or more optical links 108, each of a length $L_i$ of an optical medium, such as a fiber optic cable having a chromatic dispersion characteristic $D_i$. The transmit device 104 receives an optical signal ("input optical signal") from an optical source 110 (e.g., a SFI-4 (SERDES to Framer Interface, Level 4) input interface for an OC-192 or G.709 transmit data stream) and passes the input optical signal to a dispersion compensation filter 112. The filter 112 processes the input optical signal to generate an output optical signal that is transmitted to the remote receive device 106. The filter processing compensates for chromatic dispersion effects in the optical transmission path 102, providing a "clean" optical signal (e.g., a dispersion-free signal) at the remote receive device 106.

Figure 2:
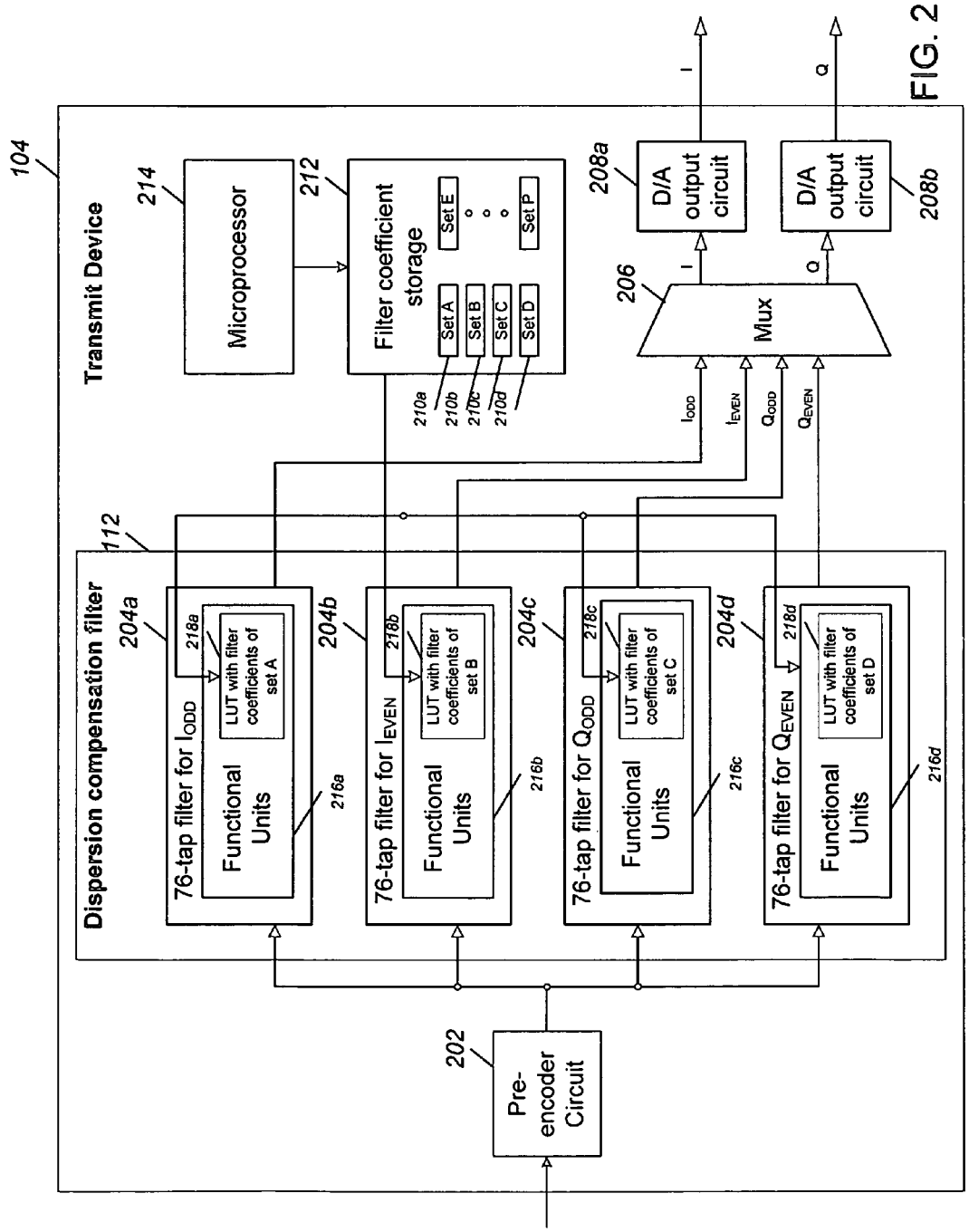
FIG. 2 is block diagram of a transmit device of the system.

Referring to FIG. 2, an example of the transmit device 104 that operates in a 10 Gb/s mode is shown. The transmit device 104 includes a pre-encoder circuit 202 that receives an input optical signal, samples the input optical signal, and generates an input data stream that is provided to the dispersion compensation filter 112 on, e.g., a 104-bit wide bus. The dispersion compensation filter 112 operates on the input data stream using four 76-tap filters 204a-204d to generate four distinct output data streams: two 12-bit I (real) output data streams ($I_{ODD}$ and $I_{EVEN}$) and two 12-bit Q (imaginary) output data streams ($Q_{ODD}$ and $Q_{EVEN}$) The parallel output data streams formed by the four 76-tap filters 204a-204d feed a multiplexer 206 that generates two output data streams: I and Q. The two output data stream feed digital-to-analog (D/A) output circuits 208a and 208b which use the I and Q output data streams to control the magnitude and phase of an output optical signal generated by the D/A output circuits 208a and 208b. The generated output optical signal is transmitted to the receive device 106 on the optical transmission path 102.

Each of the four 76-tap filters 204a-204d includes a lookup table 218a-218d that is populated with one or more sets of filter coefficients (e.g., set A 210a, set B 210b, set C 210c, and set D 210d). The sets of filter coefficients are stored in a filter coefficient storage 212 in the transmit device 104. Each filter coefficient in a set 210a-210d represents a dispersion compensation value associated with an optical link 108 in the system 100. Generally, a dispersion compensation value represents a minimum amount of dispersion compensation that has to be provided for the system 100 to achieve optimal performance.

The dispersion compensation values may be determined in any one of a number of known methods. For example, the transmit device 104 can include a microprocessor 214 that is configured to receive data relating to dispersion, length, temperature and time effects of each optical link 108 (or span of optical link 108) in the optical transmission path 102, and calculate a dispersion compensation value that may be applied to an optical signal to compensate for the dispersion effects in a corresponding optical link 108. The microprocessor 214 may be further configured to employ far end feedback, e.g., bit error rate and frame alignment word error rate, to dynamically fine tune the dispersion compensation values in order to optimize the performance of the optical link 108.

Figure 3:
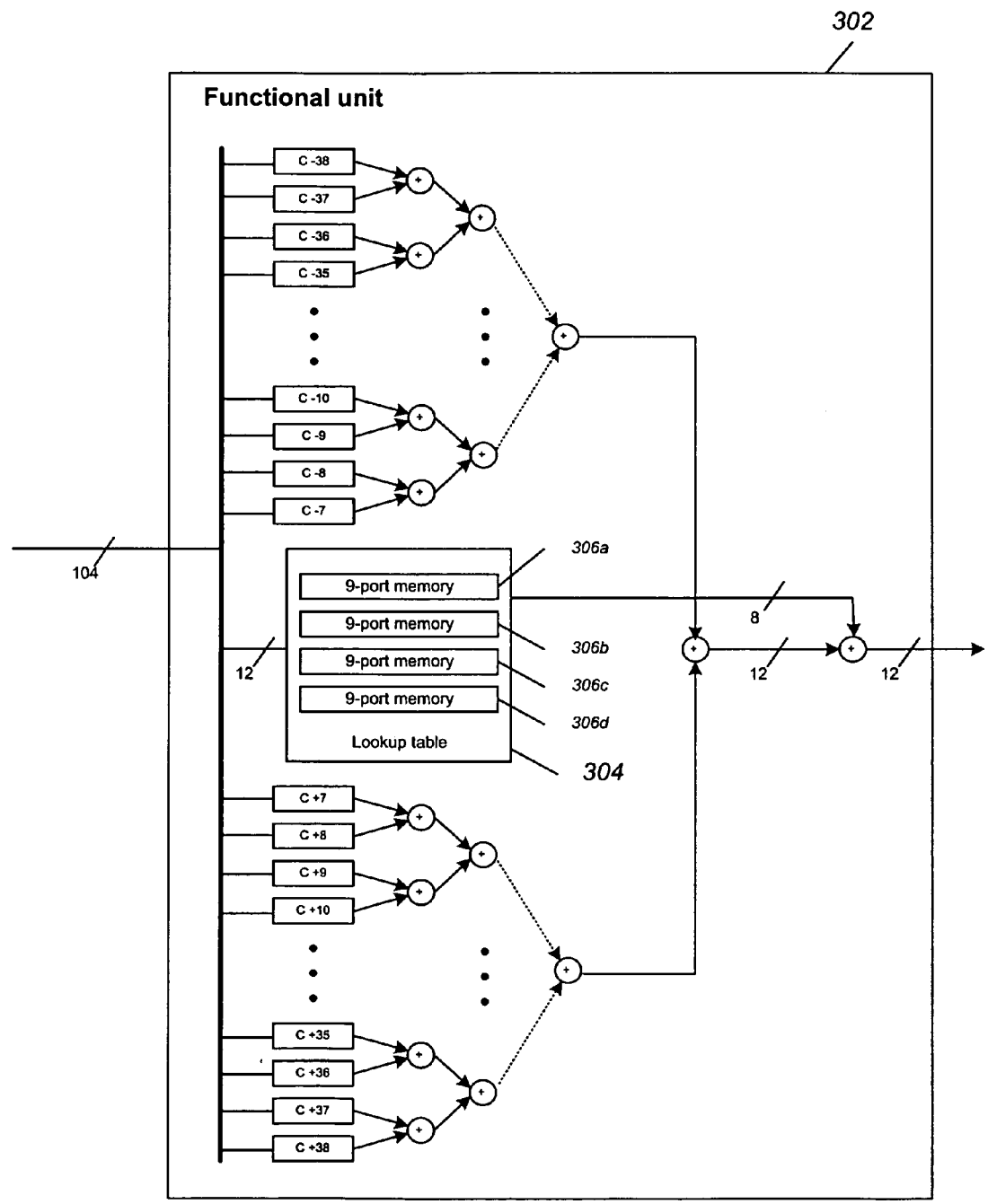
FIG. 3 is a block diagram of a functional unit of a dispersion compensation filter.

Referring now to FIGS. 2 and 3, in one implementation, each 76-tap filter 204a-204d includes 32 functional units 216a-216d that operate on 32 bits of data per clock tick. FIG. 3 shows an example of a functional unit 302 (e.g., one of the 32 functional units 216a in the 76-tap filter 204a) in detail. To simulate the characteristics of an analog filter on a sequence of digital bits produced by the pre-encoder circuit, the functional unit 302 is implemented to provide signal "context" by analyzing a 76-bit "window" of data.

For example, to process bit #1 of the input data stream, the functional unit 302 operates on a 76-bit window of data, where bit +38 corresponds to the "oldest" bit and bit −38 the "newest" bit of a 76-bit sample associated with bit #1. The 32 least significant bits (LSBs), e.g., bits +38 to +7, and the 32 most significant bits (MSBs), e.g., bits −7 to −38, of the 76-bit sample are fed to a linear adder tree of the functional unit to generate a 12-bit string representing a linear component of a final sum of bit #1. In one implementation, each of the 32 LSBs and 32 MSBs is bitwise ANDed with a filter coefficient ("flip-flop coefficient") to produce a value that feeds into the adder tree. The width of the window may range from 12 bits to 76 bits depending upon the manner in which the flip flop coefficients are populated within the linear adder tree. For example, to instantiate a 76-bit window of data, the flip-flop coefficients are fully populated. In another example, to instantiate a smaller window of data, the flip-flop coefficients associated with one or more of the MSBs and one or more of the LSBs are set to 0. By instantiating a smaller window of data for analysis, power consumption of the 76-tap filter is reduced, which may be important in certain optical fiber communication systems.

The central 12 bits, e.g., bits −6 to +6, of the 76-bit sample form an address (i.e., bit +6 represents the least significant bit and bit −6 the most significant bit of the address) to the lookup table 304 of the 76-tap filter associated with the functional unit 302. The functional unit 302 performs a lookup operation of the lookup table 304 and retrieves an 8-bit filter coefficient corresponding with the address. The retrieved 8-bit filter coefficient represents a non-linear component of the final sum of bit #1. The functional unit 302 applies the retrieved 8-bit filter coefficient to the 12-bit string generated by the linear adder tree and generates a 12-bit string representing the final sum of bit #1. In one example, the retrieved 8-bit filter coefficient is added to the 12-bit string generated by the linear adder tree. In another example, the retrieved 8-bit filter coefficient may be weighted differently from the 12-bit string generated by the linear adder tree to provide a measure of flexibility in the generation of the 12-bit string representing the final sum of bit #1. The other 31 bits are processed by the corresponding functional units 216a of the 76-tap filter 204a in the same manner.

The lookup table 304 is implemented using one or more multi-port random access memories (RAMS). In the example shown in FIG. 3, the lookup table 304 includes four nine (9)-port RAMS 306a-306d. Each of the RAMS include eight read ports and one write port. Each read port is hardwired to one of the 32 functional units in a 76-tap filter, e.g., read port 1 of the 9-port RAM 306a is hardwired to the functional unit that processes bit #1, read port 2 of 9-port RAM 306a is hardwired to bit #2 and so on. Each 9-port RAM 306a-306d can be write-addressed individually using the filter coefficients stored in the filter coefficient storage 212. Alternatively, all four 9-port RAMs 306a-306d in a functional unit can be write-addressed in parallel.

In one implementation, the 9-port RAMS operate in either "micro" mode or "datapath" mode. The 9-port RAMS operate in memory space pairs, e.g., memory space A and memory space B, where only one memory space is active in datapath mode. When the 9-port RAMS are in micro mode, the coefficients in each read port may be updated by the microprocessor 214. When the 9-port RAMS are in datapath mode, the memory addresses are the values of the data in the data path, and any attempted writes will not occur. In this manner, the filter coefficient updates of the 9-port RAMS may be performed without causing any discontinuity in the processing of the input data stream. That is, the filter coefficient update is a synchronous operation in which the 9-port RAMs switch between memory space A and memory space B on consecutive clock cycles without hitting the data.

Referring to FIG. 2, each 76-tap filter 204a-204d is associated with a different set of filter coefficients (i.e., filter coefficients of set A 210a, filter coefficients of set B 210b, filter coefficients of set C 210c, or filter coefficients of set D 210d). In this case, each 9-port RAM in a particular 76-tap filter 204a-204d is loaded with the same set of filter coefficients 210a-210d.

Figure 4:
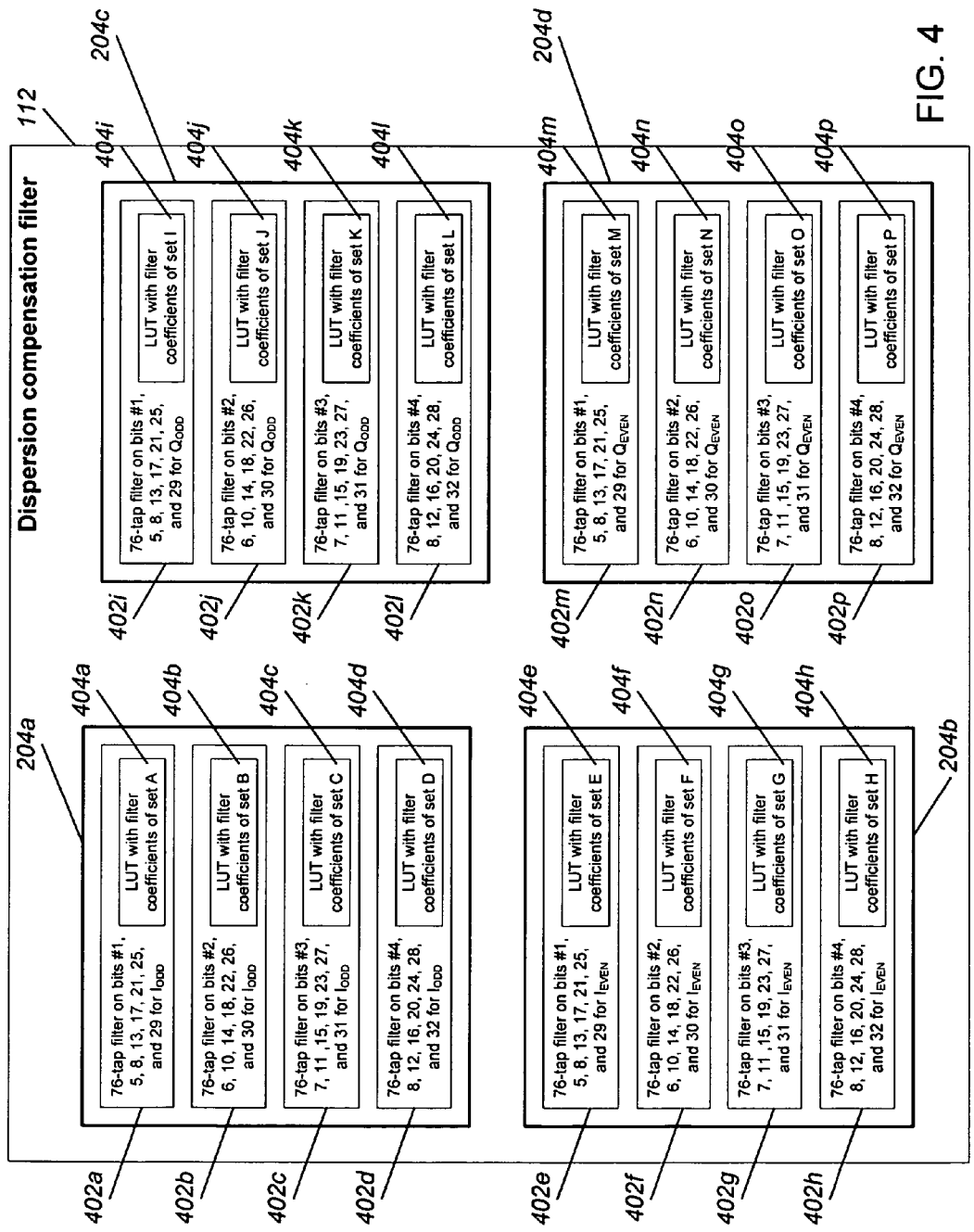
FIG. 4 is a diagram depicting functional units of a dispersion compensation filter grouped into quads.

Referring to FIG. 4, the 32 functional units of each 76-tap filter 204a-204d are grouped into 4 quads of 8 functional units each. For example, the 32 functional units of the 76-tap filter 204a are grouped into 4 quads 402a-402d, such that each of four consecutive bits are in different quads which provides for quadrature phase encoding. The lookup tables 404a-404p are loaded with different sets of filter coefficients. To generate the $I_{ODD}$ output, the dispersion compensation filter 112 applies a first set of filter coefficients (e.g., filter coefficients of set A 210a) to bits #1, 5, 8, 13, 17, 21, 25, and 29 of the input data stream, a second set of filter coefficients (e.g., filter coefficients of set B 210b) to bits #2, 6, 10, 14, 18, 22, 26, and 30 of the input data stream, a third set of filter coefficients (e.g., filter coefficients of set C 210c) to bits #3, 7, 11, 15, 19, 23, 27, and 31 of the input data stream, and a fourth set of filter coefficients (e.g., filter coefficients of set D 210d) to bits #4, 8, 12, 16, 20, 24, 28, and 32 of the input data stream. The $I_{EVEN}$, $Q_{EVEN}$ and $Q_{ODD}$ outputs may be generated by applying different sets of filter coefficients to the respective quads, as shown in FIG. 4.

The systems described herein can be implemented in digital electronic circuitry, in computer hardware, firmware, software, or in combinations of them. The systems described herein can be implemented as a computer program product, i.e., a computer program tangibly embodied in an information carrier, e.g., in a machine-readable storage device or in a propagated signal, for execution by, or to control the operation of, data processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Particular embodiments have been described, however other embodiments are within the scope of the following claims.

What is claimed is:

1. A digital filter comprising:
   one or more functional units, each functional unit being associated with a lookup table of filter coefficient values, each functional unit to process an input data stream using the filter coefficient values in the lookup table and to generate one or more output data streams for transmission on an optical link: and
   wherein the lookup table is a multi-port memory having a plurality of multi-bit read ports, each read port storing a filter coefficient value:
   wherein each functional unit further comprises:
   a linear tree adder to process a portion of the input data stream, the linear tree adder including a piurality of adders, each adder having an input for receiving one of a first input sample value and a second input sample value, and an output for providing a partial sum: and further comprising:
   a final adder having a first input for receiving a final partial sum from a last one of the plurality of adders in the linear tree adder, a second input for receiving a filter coefficient value from the lookup table, and an output for providing a final sum.

2. The digital filter of claim 1, wherein each filter coefficient value represents a dispersion compensation value associated with the optical link.

* * * * *